United States Patent [19]

Glabe

[11] 4,034,117

[45] July 5, 1977

[54] PROCESS FOR PREPARING FORAGE CROP ANIMAL FEEDS

[75] Inventor: Elmer F. Glabe, Northbrook, Ill.

[73] Assignee: Food Technology Products, Chicago, Ill.

[22] Filed: Nov. 6, 1975

[21] Appl. No.: 629,499

[52] U.S. Cl. .............................. 426/335; 426/636; 426/807; 426/532

[51] Int. Cl.² .......................................... A23K 3/03

[58] Field of Search .............. 426/2, 335, 532, 636, 426/807, 623, 635

[56] References Cited

UNITED STATES PATENTS

| | | | |
|---|---|---|---|
| 2,412,596 | 12/1946 | Bauer et al. | 426/335 X |
| 2,417,806 | 3/1947 | Bauer et al. | 426/335 X |
| 2,474,368 | 7/1949 | Bauer et al. | 426/532 X |
| 3,044,877 | 7/1962 | Lent | 426/335 |
| 3,925,559 | 12/1975 | Glabe et al. | 426/2 |

OTHER PUBLICATIONS

Hawley; G. G., "The Condensed Dictionary" Van Nostrand Reinhold Co., 1971, pp. 798–799.

*Primary Examiner*—Raymond N. Jones
*Assistant Examiner*—R. A. Yoncoskie
*Attorney, Agent, or Firm*—Richard L. Johnston

[57] ABSTRACT

Partially dried forage crops such as perennial grasses and partially dehydrated alfalfa containing at least 10% moisture are treated with sodium diacetate and stored in the form of bales or other consolidated form using a sufficient amount of sodium diacetate to reduce the rise in temperature which normally occurs on storage under such conditions while simultaneously inhibiting mold growth. The resultant products are especially useful in feeding beef and dairy cattle and other ruminants.

5 Claims, No Drawings

PROCESS FOR PREPARING FORAGE CROP ANIMAL FEEDS

BACKGROUND

The forage crops with which the present invention is concerned include hay which comprises one or more perennial grasses, e.g., alfalfa, trefoil, clovers, annuals such as Sudan grass, sorghum, Sudan hybrids, timothy and bluestem. The forage crops with which the present invention is concerned also include dehydrated alfalfa, i.e., alfalfa which has been artificially dried.

In processing hay or dried forage crops of the type mentioned above, the grasses are cut when mature and are allowed to partially dry on the ground. Frequent turning is required in order to speed drying. The moisture content of the grasses when cut will usually be in the range of 60-75% by weight. In order for the grasses to be successfully stored without fermentation beginning during storage or mold attacking the grasses, they must be dried to a moisture content below 10%. At this point the grasses are compressed into bales and they are stored in this form in covered areas on the farm or in barns.

Alfalfa, which is actually a legume, is harvested when mature. The cut alfalfa is then artificially dried, usually by using hot air resulting from the combustion of natural gas, fuel oil and indirectly by the use of high pressure steam flowing through heating coils. The alfalfa is usually cut into small pieces before being dried.

As pointed out above, the moisture content of hay at cutting time is very high, about 60-75% by weight. Reduction of this moisture to below 10% by weight, usually 7% by weight, can be effected by allowing the hay to dry in the field but this process is frequently interrupted by weather conditions. If rain falls on the grasses as they are drying on the ground, the grasses must be turned in order to prevent them from being attacked by molds or bacteria. Obviously, this increases the labor required to harvest a crop of hay.

If hay is baled before it has been sufficiently dried, the high moisture content will permit yeasts and molds to grow in the bale. This attack by microorganisms is accompanied by a very drastic increase in temperature. Consequently, when a large quantity of hay is stored in a barn, the temperature frequently reaches a high enough point for combustion to take place. The result is a sudden fire of the entire collection of hay, with resulting losses of the hay and the housing structure. This is a well known and frequently occurring difficulty on farms.

OBJECTS

One of the objects of the present invention is to provide a new and improved process for preparing dried forage crops by conditioning them in the usual manner with the removal of moisture until they can be baled, compressed or otherwise consolidated, adding to the conditioned forage crops a substance which reduces temperature rise, and thereafter consolidating the forage crops into bales or the like.

Another object of the invention is to provide new and useful animal feeds in the form of forage crops which are inhibited against the growth of mold.

A further object of the invention is to provide new and improved forage crops without the necessity for reducing the moisture content below 10%. Other objects of the invention will appear hereinafter.

BRIEF SUMMARY OF THE INVENTION

In accordance with the invention, forage crops including hay, alfalfa, or the like, are conditioned by partial drying to a point where they can be baled or otherwise consolidated which is usually below about 40% by weight moisture and in excess of at least 10% by weight moisture, the conditioned forage crops are then intimately mixed with a quantity of sodium diacetate and the resultant product is baled or otherwise consolidated and stored under ambient conditions, the quantity of sodium diacetate being sufficient to exert a temperature depressing effect upon storage and usually being within the range of 0.05% to 1.0% by weight, preferably 0.2% to 0.4% by weight, or 1 to 20 pounds per ton of forage.

DETAILED DESCRIPTION OF THE INVENTION

In order to evaluate the invention a number of experiments have been carried out with hay and dehydrated alfalfa under simulated field conditions with the addition of sodium diacetate at various dosages. In general, in order to avoid mechanical problems in baling, the hay was dried to around 40% moisture or lower. For the purpose of evaluation, previously dried hay and alfalfa were employed and rehydrated to a relatively high moisture content substantially above 10% by weight moisture and in the range of 10-'% by weight moisture. At these moisture levels baled alfalfa hay supports mold growth with an increase in temperature and danger of spontaneous combustion. The experiments showed that the addition of small amounts of sodium diacetate had a temperature depressing effect so that the baled damp hay would not reach the spontaneous combustion stage and, at the same time, was inhibited against mold growth.

The invention will be further illustrated but is not limited by the following examples in which the quantities are by weight unless otherwise indicated.

EXAMPLE I

Previously dried alfalfa hay was returned to a relatively high moisture content of 26% by rehydration with water. It was then divided into two parts, one part constituting a control and the second part being treated with sodium diacetate at a level of 4 pounds per ton of alfalfa hay (0.2% by weight sodium diacetate).

The untreated (control) materials and the materials treated with sodium diacetate were placed in glass containers and stored at room temperature or 75° F., a temperature ideal for the production of mold. The containers were fitted with caps to permit insertion of thermometers in order to determine the temperature rise over an 8 day storage period. The following results were obtained.

TABLE I

| | Temperature ° F. | | | | |
| Test Group | Initial | 5 Days | 6 Days | 7 Days | 8 Days | Maximum Temperature Increase |
| --- | --- | --- | --- | --- | --- | --- |
| Control | 75 | 76 | 84 | 92 | 85 | 17 |

TABLE I-continued

| Test Group | Temperature °F. | | | | Maximum Temperature Increase |
|---|---|---|---|---|---|
| | Initial | 5 Days | 6 Days | 7 Days | 8 Days | |
| 0.2% Sodium Diacetate (4 lbs. per ton) | 73 | 73 | 74 | 80 | 80 | 7 |

The foregoing test results show that the rehydrated alfalfa hay very quickly became affected by mold organisms, thereby bringing about a very rapid rise in temperature. The quantity of hay used in each test was 390 grams and had this been larger, the temperature would have risen to a much higher point. It is significant, however, that there is a very substantial difference in the temperature rise of the control samples as against the sodium diacetate-treated samples. Although the latter did show some temperature rise, the gain of only 7° indicates that the mold growth was successfully inhibited.

EXAMPLE II

In this example dehydrated alfalfa at 8% moisture was rehydrated to 28% moisture to simulate field conditions. The rehydrated alfalfa was divided into a control group of samples which were untreated and a second group of samples which were treated with 0.4% of sodium diacetate or 8 pounds of sodium diacetate per ton of alfalfa. The following results were obtained:

TABLE II

| Test Group | Temperatures in °F. | | | | Maximum Temperature Increase |
|---|---|---|---|---|---|
| | Initial | 5 Days | 6 Days | 7 Days | 8 Days | |
| Control | 77 | 78 | 83 | 90 | 90 | 13 |
| 0.4% Sodium Diacetate | 75 | 75 | 76 | 76 | 83 | 8 |

The net effect of the temparature gain was approximately the same with the larger amount of sodium diacetate but, again, the sodium diacetate effectively prevented a very large temperature increase.

EXAMPLE III

In this test sodium diacetate was added directly to cut grasses which had been field-dried. The sodium diacetate was mixed onto the hay during the baling process. A level of 0.4% was used. The resulting baled hay was then stored in a barn on the farmstead.

The moisture content of the hay at the time it was baled was approximately 20%. Under normal conditions, hay at this moisture content should not be baled due to the dangers described above.

Examination of the baled hay after four weeks of storage in the barn showed the hay to be completely free of any mold growth and the temperature to be approximately that of the air in the barn. On opening the bales, the hay was completely devoid of any musty odor. The slight acetic acid smell of sodium diacetate was evident. This hay when fed to livestock animals including beef and dairy cattle, was accepted by them and was preferred by them over untreated hay.

EXAMPLE IV

Dehydrated baled alfalfa hay at 10% moisture was used for tests. The hay was reconstituted to a moisture content of 65%, which would be normal for the level at cutting. A range of 2 to 20 lbs. of sodium diacetate was added to separate portions of the reconstituted hay. The mixtures were than placed in jars, the caps of which were filled with thermometers to permit observation of the temperature rise during storage of the jars at room temperature. Similar samples were placed in partially open containers for observation of mold development. (This is a simulation of hay during ordinary storge conditions). Results observed were as follows:

TABLE III

| Pounds of Sodium Diacetate per Ton of Hay | Temperature Rise from Initial 72° F. | Degree of Mold Growth* |
|---|---|---|
| None | 17° | 3 |
| 2 lbs. | 14° | 3 |
| 4 lbs. | 10° | 1 |
| 8 lbs. | 9° | 1 |
| 10 lbs. | 8° | 0 |
| 20 lbs. | 9° | 0 |

*A scale of 0 through 5 was used, with 5 indicating very heavy mold growth.

The data in Table III indicate that sodium diacetate prevents mold growth thereby preventing abnormal heating of the hay. These tests were made under stringent or accelerated laboratory conditions in which attack by molds on the hay was actually encouraged by holding the moisture content of the hay constant. In field operations, some drying of the hay would occur during storage.

EXAMPLE V

Alfalfa hay was cut on July 5. After normal sun-drying on the field, it was made up into bales on July 8 using a standard machine baler. The moisture content on July 8 was 38%.

A portion of the hay was treated with sodium diacetate during baling. The sodium diacetate was dispersed onto the hay as the bales were being formed in the baler. This is a mechanical distribution device. The rate of application was 1.3 lbs. per ton of hay (0.065%). Treated and untreated bales were thus made and collected. These were placed in separate stacks in a conventional hay mow, the upper story of a barn on the farmstead. Temperature of the bales was then measured periodically.

Hay which is field dried to below 10% moisture and then baled and subsequently stacked in a hay mow will show a normal temperature rise during the first 3–4 weeks of storage. The temperature then generally decreases and takes on the temperature of the ambient conditions during the subsequent weeks and months of storage.

Hay which has, however, been baled at a higher moisture content than 10%, will show a rapid rise in temperature. A temperature of 120° F. is a danger point. The hay must quickly be removed from the storage structure and placed in the open air to disperse the heat. If this is not done, the heat will rapidly increase and spontaneous combustion of the entire haystack and housing structure will result.

In this experiment, the temperatures were recorded as follows:

Table IV

| Days Stored | Untreated Hay | Hay Treated with 1.3 lbs. of Sodium Diacetate per Ton |
| --- | --- | --- |
| 1 | 105° F. | 105° F. |
| 5 | 118° F. | 113° F. |
| 10 | 120° F. (removed from structure) | 115° F. |
| 15 | | 102° F. |
| 20 | | 90° F. |
| 28 | | 81° F. |

Bales of untreated hay which were examined showed mold growth in the interior at 10 days' age. Examination of the treated bales made at regular intervals showed the bales to be completely free of mold growth. This finding is a parallel to the low initial temperature gain as shown in Table IV, which was followed by a highly significant temperature drop at 10 days' storage. These data indicate that there was a total arrest of all mold organism development. This is an important observation in view of the very high initial moisture content of the hay when it was baled. This was 38%, as compared to 10% maximum which would normally be required before the hay could be baled if it were not treated with sodium diacetate.

EXAMPLE VI

Alfalfa hay was cut on July 5. It was baled on July 8 at a moisture content of 30%. Sodium diacetate treatment was 1.3 lbs. per ton of hay. The same equipment was used as in Example V.

The hay bales were stored in a stack on the ground, covered with a waterproof sheet. The highest temperature attained during the subsequent days was 100° F., after which the temperature of the hay dropped to the ambient conditions. Examination of the hay bales showed no mold growth.

EXAMPLE VII

Legume hay was cut on July 4. The hay was baled on July 8 at a moisture content of 35%. Again, 1.3 lbs. of sodium diacetate per ton of hay was applied with the same mechanical devices. Storage was again outside in a six-bale pyramid. The highest temperature attained was 110° F. before the hay assumed the temperature of the ambient conditions. Again, examination of the bales showed no mold formation.

In Examples V through VII, sodium diacetate was added in the form of the following composition:

| Ingredients | Per Cent by Weight |
| --- | --- |
| Sodium Diacetate | 45 |
| Sodium Chloride | 45 |
| Dehydrated Alfalfa Meal | 8 |

-continued

| Ingredients | Per Cent by Weight |
| --- | --- |
| Mineral or Coconut Oil | 1 |
| Silicon Dioxide (e.g., Zeolex) | 1 |

In the foregoing composition the sodium chloride is used as a diluent because due to the fact that the amount of sodium diacetate is relatively small it is desirable to use a diluent in order to disperse the proper proportions onto the hay during baling operations. In this composition the dehydrated alfalfa and silicon dioxide are used as anti-humectants and the mineral or coconut oil is used as an anti-dusting factor. These substances are employed because sodium diacetate is a dusty compound and also hygroscopic compound. All of the ingredients of the composition except the sodium diacetate can be regarded as inert ingredients with respect to the mold inhibiting effect. Neither the sodium chloride nor any of the other ingredients except the sodium diacetate has any active effect in depressing temperature or inhibiting mold when dispersed on the hay during the baling operations. In order to provide 1.35 lbs. of sodium diacetate, 3 lbs. of the foregoing composition are employed.

The invention is especially useful in providing animal feeds for ruminants including beef and dairy cows, which are usually referred to as bovine animals, as well as goats, sheep, and other animals having multiple stomachs such as camels. Tests in feeding dairy cows indicate that milk production per pound of feed per cow per day is influenced by the amount of sodium diacetate the cow consumes in the range of 1 to 20 pounds of sodium diacetate per ton of feed.

The invention is hereby claimed as follows:

1. A process of treating hay and alfalfa forage crops which consists essentially in cutting and partially drying said crops in the field to a moisture content above 10% but not more than 65% by weight, intimately mixing the resultant forage crops with a quantity of sodium diacetate, and then consolidating the resultant product and storing it at ambient temperatures, the said temperature and moisture conditions being such that said crops when stored at ambient external temperatures in a baled or otherwise consolidated condition will reach an internal temperature of at least 120° F. at which they would normally have to be removed from storage to avoid spontaneous combustion, the quantity of sodium diacetate being sufficient to have a temperature depressing effect when the consolidated product is stored at ambient temperatures so that said internal temperature remains below 120° F.

2. A process as claimed in claim 1 in which the quantity of sodium diacetate is within the range of 0.05% to 1% by weight.

3. A process as claimed in claim 1 in which the quantity of sodium diacetate is within the range of 0.2% to 0.4% by weight.

4. A process as claimed in claim 1 in which the forage crop is hay.

5. A process as claimed in claim 1 in which the forage crop is partially dehydrated alfalfa.

* * * * *

UNITED STATES PATENT AND TRADEMARK OFFICE
CERTIFICATE OF CORRECTION

PATENT NO. : 4,034,117
DATED : July 5, 1977
INVENTOR(S) : ELMER F. GLABE

It is certified that error appears in the above-identified patent and that said Letters Patent are hereby corrected as shown below:

In the "References Cited", "2,474,368" should read --2,475,368--.

Column 2, line 35, "10-'%" should read --10-40%--.

Column 6, line 16, before "hygroscopic" insert --a--.

Signed and Sealed this

Twenty-second Day of November 1977

[SEAL]

Attest:

RUTH C. MASON
Attesting Officer

LUTRELLE F. PARKER
Acting Commissioner of Patents and Trademarks